US008820969B2

(12) United States Patent
Roll et al.

(10) Patent No.: US 8,820,969 B2
(45) Date of Patent: Sep. 2, 2014

(54) EXPLOSION PROTECTION HOUSING WITH SIGNALING DEVICE

(75) Inventors: Siegfried Roll, Schwabisch Hall (DE); Helmut Wurz, Niedernhall (DE)

(73) Assignee: R. Stahl Schaltgeräte GmbH, Waldenburg (DE)

( * ) Notice: Subject to any disclaimer, the term of this patent is extended or adjusted under 35 U.S.C. 154(b) by 200 days.

(21) Appl. No.: 13/496,747

(22) PCT Filed: Sep. 15, 2010

(86) PCT No.: PCT/EP2010/063574
§ 371 (c)(1),
(2), (4) Date: Jul. 26, 2012

(87) PCT Pub. No.: WO2011/032997
PCT Pub. Date: Mar. 24, 2011

(65) Prior Publication Data
US 2012/0281419 A1 Nov. 8, 2012

(30) Foreign Application Priority Data
Sep. 17, 2009 (DE) .......................... 10 2009 041 612

(51) Int. Cl.
*F21V 25/12* (2006.01)
*F21V 31/00* (2006.01)
(52) U.S. Cl.
USPC .......................... 362/267; 362/268; 362/362
(58) Field of Classification Search
USPC .......... 362/267, 555, 558, 268, 551, 331, 362
See application file for complete search history.

(56) References Cited

U.S. PATENT DOCUMENTS

| 4,156,891 | A  | * | 5/1979  | Roche ............................. 362/20 |
| 4,463,399 | A  |   | 7/1984  | Matherly et al. |
| 5,042,048 | A  | * | 8/1991  | Meyer ............................ 372/108 |
| 7,525,424 | B2 | * | 4/2009  | Morse et al. ............... 340/539.1 |
| 7,591,098 | B2 | * | 9/2009  | Matthews et al. .................. 42/85 |
| 7,896,523 | B2 | * | 3/2011  | Drolshagen et al. .......... 362/259 |
| 8,228,206 | B2 | * | 7/2012  | Manahan ...................... 340/626 |
| 2010/0277089 | A1 | * | 11/2010 | Chien ........................... 315/287 |

FOREIGN PATENT DOCUMENTS

| EP | 0823589 A2 | 2/1998 |
| EP | 1345300 A2 | 9/2003 |
| GB | 2082748 A  | 3/1982 |

OTHER PUBLICATIONS

International Search Report in corresponding PCT/EP2010/063574, dated Apr. 14, 2011.

* cited by examiner

*Primary Examiner* — Peggy Neils
(74) *Attorney, Agent, or Firm* — Leydig, Voit & Mayer, Ltd.

(57) ABSTRACT

The invention relates to an explosion protection housing having a threaded opening. A threaded bushing comprising a glass body in the interior thereof is mounted in the threaded opening. The glass body has a diverging lens on the exterior and a converging lens on the interior. A light-emitting diode is present at the focal point of the converging lens. In this manner, that light impinging within the capture region of the converging lens is converted into parallel light passing through the glass body to the diverging lens. The parallel light bundle is converted back into a divergent light bundle by the diverging lens so that the emerging light is visible from a wide angle range.

18 Claims, 2 Drawing Sheets

EXPLOSION PROTECTION HOUSING WITH SIGNALING DEVICE

CROSS-REFERENCE TO RELATED APPLICATIONS

This patent application is a U.S. National Phase application under 35 U.S.C. §371 of International Application No. PCT/EP2010/063574, filed on Sep. 15, 2010 and claims the benefit to German Patent Application No. 10 2009 041 612.9, filed on Sep. 17, 2009. The International Application was published in German on Mar. 24, 2011 as WO 2011/032997 A2 under PCT Article 21(2)

FIELD OF THE INVENTION

The present invention relates generally to explosion protection housings, and more particularly, to explosion protection housings having a light signaling device therein.

BACKGROUND OF THE INVENTION

It is frequently necessary to signal certain operating states of systems. If these systems are operated in a normal environment that is not potentially explosive, this is simply accomplished with light-emitting diodes that are arranged on the device. However, the situation is more complicated if the system components are encapsulated due to a potentially explosive atmosphere. When signaling devices are arranged outside the explosion protection housing, the electric lines need to be routed through the wall of the housing often in difficult and elaborate fashion. While it would be easier to accommodate the signaling device with the housing, this would create a visibility problem.

It is further known to fit the explosion protection housing with transparent panes, through which readings of measuring devices located behind the panes can be made. However, transparent materials are not as strong as the remaining material of the housing, which becomes a particularly troublesome factor if the transparent pane occupies a large area. The larger the surface area of the transparent pane, the more difficult it is to ensure its resistance to breaking from pressure occurring when an explosion within the interior of the housing takes place.

If a light-emitting diode wire were arranged in the housing as a light source, in that case, a slender rod of transparent material would, in principle, suffice for rendering the light source or the light-emitting diode visible from outside the housing. However, the small angle at which the light emerges is disadvantageous to that approach. Another troublesome factor is that the light originating from the light source or the light-emitting diode is emitted in a divergent fashion. Only part of this type of light would be totally reflected on the cylindrical outer surface of the rod-shaped optical waveguide. Since a majority of the emitted light would be absorbed at this location, the luminous efficiency is inferior or inadequate.

OBJECTS AND SUMMARY OF THE INVENTION

It is an object of the invention to provide an explosion proof protection housing having a light signaling device therein adapted for more effectively emitting light that is visible from a relatively broad angular range with minimal light being lost during transmission.

The novel housing includes a through-opening in one wall with a packing of transparent material seated in the through-opening. The packing is provided with planar faces on both ends. A converging lens is situated in front of the planar face that faces the housing interior while a diverging lens is provided adjacent to the outer planar face.

Due to the converging lens arranged on the inner side of the housing, a large part of the light emitted in a divergent fashion is converted into a ray of light with parallel beams. Light that would otherwise be absorbed at this location without a converging lens reaches the interior of the packing due to the converging lens and can be transmitted outwardly without reflection on boundary surfaces.

The diverging lens arranged on the outer side ensures that the ray of light consisting of parallel light beams is once again fanned out in order to achieve a broad viewing angle.

Hence, due to the combination of the converging lens and the diverging lens, the light-emitting diode is quasi-shifted to the outside of the packing.

The opening in the housing may consist of a threaded bore and the packing may be seated and bonded in a threaded bushing. The packing may have a cylindrical shape such that the installation in the bushing is greatly simplified. The diameter of the packing may be between 10 mm and 20 mm such that an overall strength comparable to that of the adjacent wall is achieved.

The converging lens and the diverging lens may be integrally joined to the packing or be manufactured in one piece together with the packing without joinder areas. Favorable optical conditions can be achieved if the converging lens and the diverging lens consist of aspherical, rotationally symmetrical lenses, i.e., they may preferably consist of parabolic lenses.

Other objects and advantages of the invention will become apparent upon reading the following detailed description and upon reference to the drawings, in which:

BRIEF DESCRIPTION OF THE DRAWINGS

FIG. 1 is a front view of an explosion protection housing in accordance with the invention; and.

Figure 1:
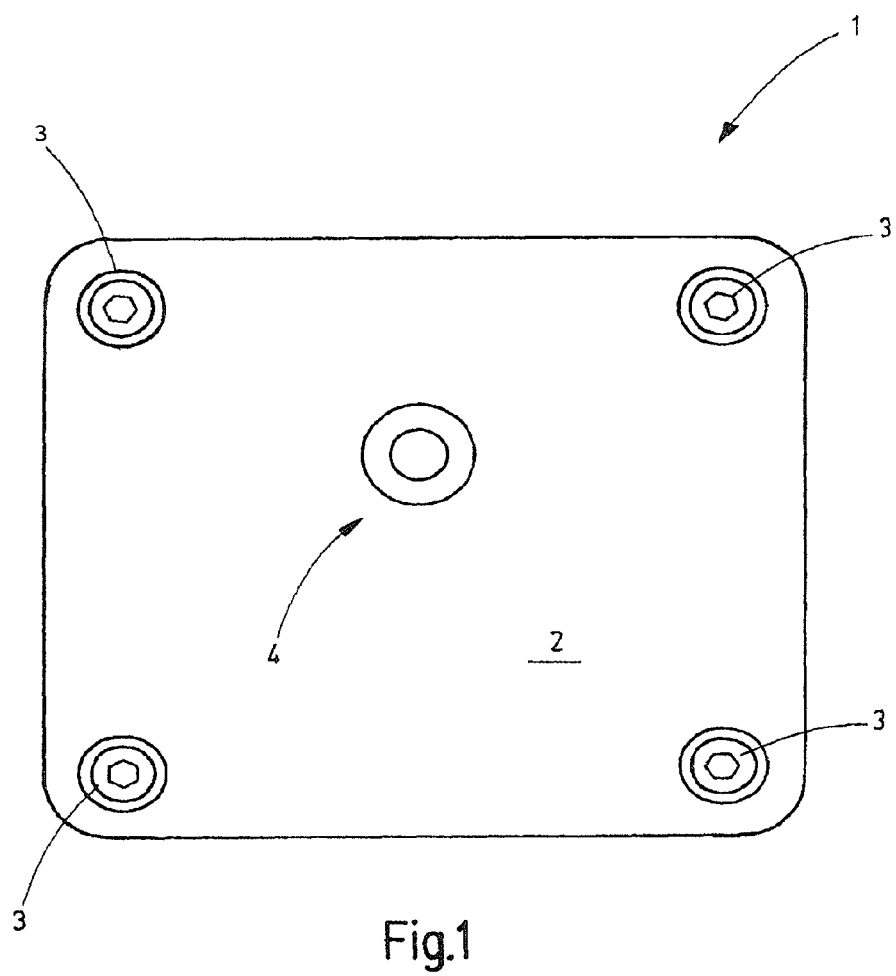

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

The following description of the Figures is for enabling a comprehension of the invention. A person skilled in the art can conventionally gather other details that are not described from the drawings that may supplement the description of the figures. It goes without saying that a number of modifications are possible.

The figures described below are not necessarily true-to-scale. For example, certain areas may be illustrated excessively large in order to show certain details. In addition, the drawings are simplified and do not contain every detail that may exist in the practical embodiment. The terms "top" and "bottom" and the terms "left" and "right" refer to the illustration in the figures.

DESCRIPTION OF THE PREFERRED EMBODIMENTS

Referring now more particularly to the drawings, there is shown an illustrative explosion protection housing 1 in accordance with the invention, and more particularly to explosion protection housings having a light signaling device therein, a front side or front plate 2 which faces the viewer. The front plate 2 is fastened on a housing body situated directly behind the front plate 2 with a plurality, in this case four, screws 3.

Figure 2:
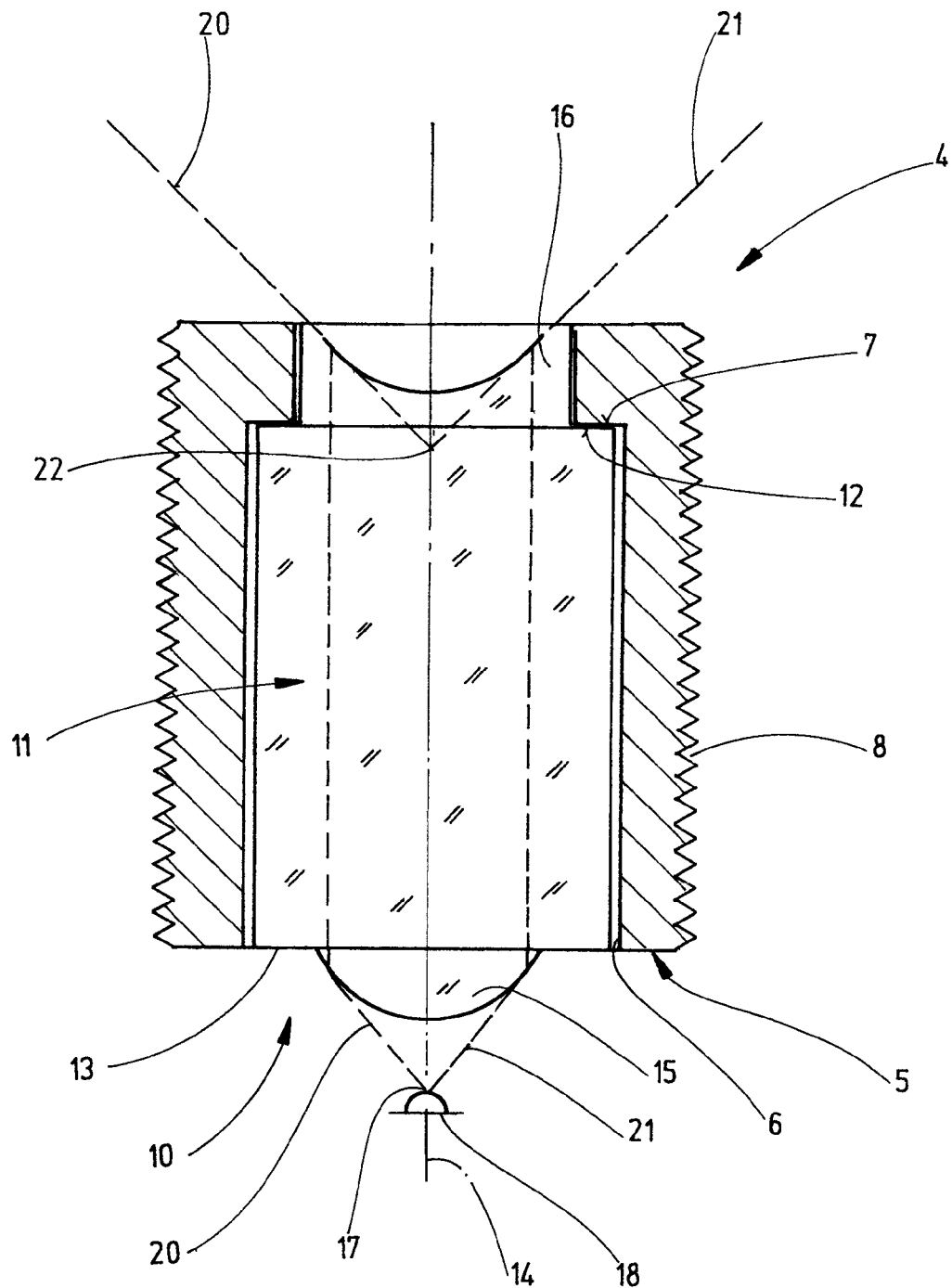
FIG. 2 is an enlarged longitudinal section of the signaling device assembly of the illustrated housing.

A signaling device 4, as depicted in FIG. 2, is seated in the front plate 2. The signaling device 4 includes a threaded bushing 5 having a central cylindrical shouldered bore 6. The diameter of the shouldered bore 6 changes at a planar shoulder 7. In this case, the shoulder 6 faces toward the housing interior, i.e., the section of the shouldered bore that lies toward the front side of the housing has a smaller diameter than the section of the shouldered bore that lies toward the inner side of the housing. The section that lies toward the inner side of the housing in this case also has a considerably greater length.

On its outer periphery, the threaded bushing 5 is provided with a continuous thread 8, by means of which it is screwed into a corresponding through-bore in the front plate 2. The thread 8 of the bushing 5 and the thread in the front plate 2 form an explosion-proof junction.

A glass body 10 is seated in the shouldered bore 6. The glass body 10 consists of a clear, transparent material such as, for example, natural glass or a corresponding plastic such as, for example, acrylic polymer or polycarbonate. The glass body 10 in this instance is in the form of a rotationally symmetrical body having a cylindrical center section 11 that extends between a planar face 12 adjacent to the shoulder 7 and a planar face 13 facing the housing interior. The outside diameter of the center section 11 corresponds to the inside diameter of the section of the through-bore 6 with the largest diameter. A planar face 12 of the cylindrical section 11 abuts the shoulder 7 while a planar face 13 at the opposite end is arranged flush with the corresponding adjacent end of the threaded bushing 5.

A converging lens 15, the optical axis of which coincides with the longitudinal axis of the cylindrical center section 11 is provided on the inner planar face 13. The converging lens 15 may consist of a spherical lens or of an aspherical parabolic lens. The latter design is advantageous for optical reasons.

A diverging lens 16, the optical axis of which coincides with the optical axis 14 of the system, is situated on the planar face 12. The diverging lens 16 may also consist of a spherical lens or an aspherical lens with a paraboloidal face. Viewed from outside the housing, the diverging lens 16 is preferably is provided with a concave recess. In the preferred exemplary embodiment, the recess has a spherical contour that tangentially transforms into a conical contour on its circumference in the center around the optical axis of the diverging lens 16.

The two lenses 15 and 16 may be bonded or cemented to the center section 11 on its planar faces or be realized in one piece with said center section and therefore be free of joining areas. The design with no joining areas makes it possible to inject the entire glass body 10 in one piece.

The smaller diameter section of the shouldered bore 6, as depicted in FIG. 2, has a length toward the outer side that corresponds to the structural length of the diverging lens 16 adjacent to the shoulder 7. Consequently, it does not protrude over the end face of the threaded bushing 5.

The glass body 10 preferably is bonded into the shouldered bore 6. Due to the bonding at the juncture of the planar face 12 with the shoulder 7, a very effective fastening of the glass body 10 in the threaded bushing 5 is achieved. An explosion in the interior of the explosion protection housing 1, therefore, is unable to eject the glass body 10 from the threaded bushing 5.

Since the diameter of the glass body 10 is very small, it is not necessary to use a particularly strong material. It is particularly advantageous if the diameter of the central section 11 is smaller than its length.

The dimensioning of the focal lengths of the two lenses 15 and 16 preferably is functionally designed as set forth below. The converging lens 15 has a relatively short focal length. A light source is situated in its focal point indicated with the reference symbol 17. In the illustrated embodiment, a point source of light is provided that emits divergent light, preferably a light-emitting diode 18. Such light-emitting diode 18 emits light in an azimuth angle, the boundaries of which are symbolized by marginal beams 20, 21. This light is converging lens 15 and transformed into a parallel ray beam that passes through the central section 11 essentially without attenuation. The light reaches the optically effective surface of the diverging lens 16 in the form of a parallel ray of light, wherein said diverging lens once again fans the parallel ray of light out into a divergent ray of light.

The shorter the focal length of the diverging lens 16, the greater the angle between the two marginal beams 20, 21 after they emerge from the lens 16. The illustrated diverging lens 16 has a virtual focal point indicated with the reference symbol 22 and lies in the vicinity of the planar face 12.

Light emitted by the light-emitting diode 18 outside the two marginal beams 20, 21 is lost and not visible from outside. However, the light-emitting diode 17 preferably has a radiation lobe such that the light emitted between the marginal beams 20, 21 represents the majority of the emitted light. As depicted in FIG. 2, practically the entire emitted light from the light-emitting diode 18 is guided to the outer side of the housing through the glass body 10 and then once again emitted in the form of a divergent ray of light. Due to the optics, the light-emitting diode 18 is seemingly shifted into the focal point 22 of the diverging lens 16.

Due to the optics used, practically the entire light emitted by the light-emitting diode 18 is made available on the front side of the explosion protection housing for signaling purposes. The light is also visible from a very broad angular range, i.e., very far from the optical axis 14, due to the divergence of the light at this location.

It is also apparent from the foregoing that signaling device 4 is a very simple design and requires no electrical leadthroughs. The components of the signaling device 4 also can practically be inserted into any threaded bushing present in the explosion protection housing as well as threaded bores through which explosion-proof cables are normally routed into the housing.

The signaling device is not only suitable for housings of the flame-proof encapsulation type of protection, but likewise for housings with powder filling if it is to be ensured that no powder is admitted into the space between the light-emitting diode and the converging lens 15. Since the converging lens 15 has a very short focal length, a corresponding clearance can be easily created, for example, by providing an additional conical housing at this location, wherein the light-emitting diode protrudes into this additional conical housing from one end and the converging lens protrudes therein from the other end. The volume being created is so small that the powder filling is not affected thereby. The inner walls of such a housing would correspond to the path of the marginal beams 20, 21 shown between the light-emitting diode 18 and the planar face 13.

From the foregoing, it can be seen that an explosion protection housing device is provided that has a threaded opening into which a threaded bushing is seated that contains a glass body in its interior The glass body is provided with a diverging lens on the outer side and a converging lens on the inner side. A light-emitting diode is situated in the focal point of the converging lens. In this way, it is ensured that light incident within the capture range of the converging lens is converted into parallel light that passes through the glass body and transmitted to the diverging lens. Due to the diverging lens, the parallel ray of light is once again converted into a divergent ray of light such that the emerging light is visible from a broad angular range.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An explosion protection housing comprising:
    a housing body (1) with a wall having a through opening therein,
    a clear, transparent packing (10) seated in the through opening having opposite ends defined by inner and outer planar faces, said inner planar face (13) being located in the housing body (1) and said outer planar face being visible from outside the housing,
    a converging lens (15) in front of the inner planar face (13),
    a diverging lens (16) in front of the outer planar face (12), and
    a light source (18) in front of the inner converging lens (15) for transmitting light to said inner converging lens (15) and in turn through said packing (10) and the diverging lens (16).

2. The explosion protection housing according to claim 1 in which the light source is a point source of light.

3. The explosion protection housing according to claim 1 in which said light source is a light emitting diode (18).

4. The explosion protection housing according to claim 1 in which said through opening is a threaded bore.

5. The explosion protection housing according to claim 1 in which said packing (10) is seated in a threaded bushing (5).

6. The explosion protection housing according to claim 1 in which said packing (10) is cylindrically shaped.

7. The explosion protection housing according to claim 1 in which said converging lens (5) and diverging lens (16) are integrally formed parts of said packing (10) without joinder areas.

8. The explosion protection housing according to claim 1 in which said converging lens (15) and diverging lens (16) are connected to the packing (10) with a joinder area.

9. The explosion protection housing according to claim 1 in which said packing (10) is made of a plastic material.

10. The explosion protection housing according to claim 1 in which said packing (10) is made of a natural glass material.

11. The explosion protection housing according to claim 5 in which said packing (10) is bonded within the threaded bushing (5).

12. The explosion protection housing according to claim 1 in which said converging lens (15) and diverging lens (16) are spherical lenses.

13. The explosion protection housing according to claim 1 in which said converging lens (15) and diverging lens (16) are aspherical lenses.

14. The explosion protection housing according to claim 5 in which said bushing is formed with a shouldered bore having a shoulder facing an inside of said housing body, and said packing is seated against said shoulder.

15. An explosion protection housing comprising:
    a housing body with a wall having a through opening therein,
    a clear, transparent packing (10) seated in the through opening having an inner end facing an inside of said housing body (1) and an outer end facing an outside of said housing body,
    a converging lens (15) at the inner end of the packing (10) facing an inside of the housing,
    a diverging lens (16) at an end of the packing (10) facing an outer side of the housing, and
    a light source (18) in front of the converging lens (15) such that light from the light source (18) impinging on the converging lens (15) is converted into parallel light rays passing through the packing (10) to the diverging lens (16) whereupon the parallel light rays are converted back into a divergent light beam for direction from the housing body.

16. The explosion protection housing according to claim 15 in which said light source is a light emitting diode (18).

17. The explosion protection housing according to claim 15 in which said through opening is a threaded bore, and said packing (10) is seated in a threaded bushing (5).

18. The explosion protection housing according to claim 15 in which said converging lens (15) and diverging lens (16) are spherical lenses.

* * * * *